United States Patent
Ridgeway et al.

(10) Patent No.: US 11,713,328 B2
(45) Date of Patent: Aug. 1, 2023

(54) STABLE ALKENYL OR ALKYNYL-CONTAINING ORGANOSILICON PRECURSOR COMPOSITIONS

(71) Applicant: Versum Materials US, LLC, Tempe, AZ (US)

(72) Inventors: Robert G. Ridgeway, Chandler, AZ (US); Raymond N. Vrtis, Carefree, AZ (US); Xinjian Lei, Vista, CA (US); Madhukar B. Rao, Carlsbad, CA (US); Steven Gerard Mayorga, Oceanside, CA (US); Neil Osterwalder, Carlsbad, CA (US); Manchao Xiao, San Diego, CA (US); Meiliang Wang, San Marcos, CA (US)

(73) Assignee: VERSUM MATERIALS US, LLC, Tempe, AZ (US)

( * ) Notice: Subject to any disclaimer, the term of this patent is extended or adjusted under 35 U.S.C. 154(b) by 0 days.

(21) Appl. No.: 16/547,468

(22) Filed: Aug. 21, 2019

(65) Prior Publication Data
US 2020/0062787 A1 Feb. 27, 2020

Related U.S. Application Data

(60) Provisional application No. 62/722,090, filed on Aug. 23, 2018.

(51) Int. Cl.
*C07F 7/08* (2006.01)
*B01D 3/00* (2006.01)

(52) U.S. Cl.
CPC ............ *C07F 7/0803* (2013.01); *B01D 3/009* (2013.01)

(58) Field of Classification Search
CPC ........ C07F 7/20; C07F 7/0801; C07F 7/0805; C07F 7/0825; C07F 7/0827; C07F 7/0829; C07F 7/083; C07F 7/0832
See application file for complete search history.

(56) References Cited

U.S. PATENT DOCUMENTS

| | | | | |
|---|---|---|---|---|
| 3,816,267 A * | 6/1974 | Chuang | ................... | C07C 67/62 203/8 |
| 4,563,538 A * | 1/1986 | Wakabayashi | ............ | C07F 7/20 203/62 |
| 5,138,081 A * | 8/1992 | DeVries | ................ | C07F 7/0889 556/466 |
| 5,616,753 A * | 4/1997 | Turner | ................... | C07F 7/1804 556/401 |
| 5,693,839 A * | 12/1997 | Reitmeier | ................ | C01B 33/04 556/401 |
| 6,841,694 B2 * | 1/2005 | Pfeiffer | ..................... | C07F 7/20 556/401 |
| 7,335,784 B2 * | 2/2008 | Onodera | ................... | C07F 7/20 556/440 |
| 7,423,166 B2 * | 9/2008 | Chen | ..................... | C08G 77/34 556/464 |
| 2003/0149213 A1 | 8/2003 | Mayorga et al. | | |
| 2004/0171859 A1 * | 9/2004 | Pfeiffer | ..................... | C07F 7/20 556/401 |
| 2011/0118493 A1 * | 5/2011 | Ziche | .................... | C07F 7/1892 556/401 |
| 2013/0099020 A1 | 4/2013 | Voser et al. | | |
| 2018/0025907 A1 * | 1/2018 | Kalutarage | ....... | H01L 21/02323 438/786 |
| 2019/0376178 A1 * | 12/2019 | Ridgeway | ............... | C23C 16/50 |
| 2020/0313236 A1 * | 10/2020 | Morinaka | ......... | H01M 10/0525 |

FOREIGN PATENT DOCUMENTS

| | | | | |
|---|---|---|---|---|
| GB | 1003874 A | * | 9/1965 | ................ C07F 7/20 |
| JP | 2005-071741 A | | 3/2005 | |
| JP | 2018-052918 A | | 4/2018 | |
| JP | 2018052918 A | * | 4/2018 | |
| KR | 2018003428 A | * | 1/2018 | ......... A63B 53/0466 |
| TW | I275106 B | | 3/2007 | |
| WO | WO-2005040084 A1 | * | 5/2005 | ............. C07C 67/62 |

OTHER PUBLICATIONS

English-Language Machine Translation JP-2018052918-A (2018) (Year: 2018).*
GuideChem Chemical Trading Guide (2017) (Year: 2017).*
Y. Khoroshavina et al, 83 Russian Journal of General Chemistry, 1039-1042 (2013) (Year: 2013).*
T. Wilkins, Metano Tote Talk Blog (2017) (Year: 2017).*
Ereztech LLC, Safety Data Sheet (2016) (Year: 2016).*
Agilent, An Introduction to Gel Permeation Chromatography and Size Exclusion Chromatography (2015) (Year: 2015).*
Divinyldimethylsilane Cas No. 10519-87-6.
Tetravinylsilane Cas No. 1112-55-6.

* cited by examiner

*Primary Examiner* — Alexander R Pagano
(74) *Attorney, Agent, or Firm* — Daniel C. Roth

(57) ABSTRACT

A method for producing an alkenyl or alkynyl-containing organosilicon precursor composition, the method comprising the steps of distilling at least once a composition comprising an alkenyl or alkynyl-containing organosilicon compound having the formula $R_nSiR^1_{4-n}$ wherein R is selected a linear or branched $C_2$ to $C_6$ alkenyl group, a linear or branched $C_2$ to $C_6$ alkynyl group; $R^1$ is selected from hydrogen, a linear or branched $C_1$ to $C_{10}$ alkyl group, and a $C_3$ to $C_{10}$ cyclic alkyl group; and n is a number selected from 1 to 4, wherein a distilled alkenyl or alkynyl-containing organosilicon precursor composition is produced after distilling; and packaging the distilled alkenyl or alkynyl-containing organosilicon precursor composition in a container, wherein the container permits transmission into the container of no more than 10% of ultraviolet and visible light having a wavelength of between 290 nm to 450 nm.

8 Claims, No Drawings

# STABLE ALKENYL OR ALKYNYL-CONTAINING ORGANOSILICON PRECURSOR COMPOSITIONS

CROSS-REFERENCE TO RELATED APPLICATIONS

This application claims priority to U.S. provisional application 62/722,090 filed on Aug. 23, 2018, the entire contents of which is incorporated herein by reference thereto for all allowable purposes.

FIELD OF THE INVENTION

The present invention is related to the field of low dielectric constant materials prepared by chemical vapor deposition (CVD) methods which serve as insulating layers in electronic devices. In particular, the present invention is directed to an alkenyl or alkynyl-containing organosilicon precursor compositions for use as precursors to dielectric materials that eliminate process problems related to precipitation of impurities caused by self-polymerization in the liquid state.

BACKGROUND OF THE INVENTION

Alkenyl or alkynyl-containing organosilicon precursor compounds such as, for example, tetravinylsilane (TVS) have been identified as leading candidates for the deposition of silicon carbide (SiC), silicon oxycarbide (SiOC), and silicon carbonitride (SiCN) films. During a conventional deposition process, a direct liquid injection (DLI) technique is employed to repeatedly deliver precisely controlled quantities of precursor compounds to the process tool deposition chamber. The deposition process can include chemical vapor deposition (CVD), atomic layer deposition (ALD), plasma enhanced chemical vapor deposition (PECVD), flowable chemical vapor deposition (FCVD), plasma enhanced atomic layer deposition (PEALD) or other methods to deposit these films.

During deposition it is necessary to deliver a constant flow of alkenyl or alkynyl-containing organosilicon precursor compound and alkenyl or alkynyl-containing organosilicon precursor compound-like precursors to the process tool using the combination of a liquid mass flow controller (LMFC) and a heated vaporizing injector system that will volatize the precursor, which will be swept away from the injector through a heated delivery line to the process chamber. During this process it is critical that non-volatile residues or components do not accumulate in the LMFC, injector, or chemical delivery line. The unsaturated moiety of the organosilicon precursor compound is prone to polymerization and the organosilicon precursor compound will gradually degrade or polymerize and precipitate out at ambient temperature or at moderate temperatures that are often encountered during normal processing, purification or application of the particular chemical. Such build-up of residues/precipitate leads to a disruption in flow of vapor into the process chamber, which would severely impact the repeatability of film growth making the process unworthy of high volume manufacturing (HVM).

Such examples of residues could include the residue left behind in the injector as a result of impurities in the alkenyl or alkynyl-containing organosilicon precursor compound, like chlorine-containing impurities that have less volatility relative to the alkenyl or alkynyl-containing organosilicon precursor compound, and higher molecular weight impurities resulting from self-initiated polymerization of the alkenyl or alkynyl-containing organosilicon precursor compound due to light absorption or the presence of other free radical generating impurities. In such instances it is believed that the higher molecular weight impurities would remain soluble in the alkenyl or alkynyl-containing organosilicon precursor compound until they passed thru the injector and would then begin to either thicken or condense and fall out into the gas delivery line where they would accumulate, eventually obstructing the flow of gas into the process chamber.

To prevent such disruptive phenomena from occurring it is necessary to have the proper composition of the alkenyl or alkynyl-containing organosilicon precursor compound, which includes a concentration of impurities that falls within a given range for both low and higher molecular weight impurities. Accordingly, there is a need for an alkenyl or alkynyl-containing organosilicon precursor compound that is produced as pure as possible and which remains pure over time, once it is packaged.

BRIEF SUMMARY OF THE INVENTION

The present invention provides a method for producing an alkenyl or alkynyl-containing organosilicon precursor composition, the method comprising the steps of: distilling at least once a composition comprising an alkenyl or alkynyl-containing organosilicon compound having the formula $R_nSiR^1_{4-n}$ wherein R is selected from a linear or branched $C_2$ to $C_6$ alkenyl group, a linear or branched $C_2$ to $C_6$ alkynyl group; $R^1$ is selected from hydrogen, a linear or branched $C_1$ to $C_{10}$ alkyl group, a $C_3$ to $C_{10}$ cyclic alkyl group, and a $C_3$ to $C_{10}$ aryl group; and n is a number selected from 1 to 4, and wherein a distilled alkenyl or alkynyl-containing organosilicon precursor composition is produced after distilling; and packaging the distilled alkenyl or alkynyl-containing organosilicon precursor composition in a container, wherein the container permits transmission into the container of no more than 10% of ultraviolet and visible light having a wavelength of between 290 nm to 450 nm.

In another aspect, the present invention provides a system for storing an alkenyl or alkynyl-containing organosilicon compound, the system comprising: a container, wherein the container permits transmission into the container of no more than 10% of ultraviolet and visible light having a wavelength of between 290 nm to 450 nm; and contained within the container, a distilled alkenyl or alkynyl-containing organosilicon compound having the formula $R_nSiR^1_{4-n}$ wherein R is selected a linear or branched $C_2$ to $C_6$ alkenyl group, a linear or branched $C_2$ to $C_6$ alkynyl group; $R^1$ is selected from hydrogen, a linear or branched $C_1$ to $C_{10}$ alkyl group, a $C_3$ to $C_{10}$ cyclic alkyl group, and a $C_3$ to $C_{10}$ aryl group and; and n is a number selected from 1 to 4.

The various embodiments of the invention can be used alone or in combinations with each other.

DETAILED DESCRIPTION OF THE INVENTION

Described is a method for producing an alkenyl or alkynyl-containing organosilicon precursor composition, the method comprising the steps of: distilling at least once a composition comprising an alkenyl or alkynyl-containing organosilicon compound having the formula $R_nSiR^1_{4-n}$ wherein R is selected a linear or branched $C_2$ to $C_6$ alkenyl group, a linear or branched $C_2$ to $C_6$ alkynyl group; $R^1$ is selected from hydrogen, a linear or branched $C_1$ to $C_{10}$ alkyl group, a $C_3$ to $C_{10}$ cyclic alkyl group, and a $C_3$ to $C_{10}$ aryl group; and n is a number selected from 1 to 4, wherein a distilled alkenyl or alkynyl-containing organosilicon precursor composition is produced after distilling; and packaging the distilled alkenyl or alkynyl-containing organosilicon precursor composition in a container, wherein the container permits transmission into the container of no more than 10% of ultraviolet and visible light having a wavelength of between 290 nm to 450 nm.

The precursors of various embodiments include alkenyl (vinyl) and/or alkynyl groups. In one or more embodiments, in their intended use, the precursors are exposed to reactive radicals to initiate a radical induced polymerization in the deposition chamber.

In one embodiment, the method of the present invention further comprises adding a stabilizer compound to the distilled alkenyl or alkynyl-containing organosilicon precursor composition prior to said packing step.

To the extent that a composition comprising a crude (i.e., prior to purification by distillation according to the present invention) alkenyl or alkynyl-containing organosilicon compound such as, for example, one having a residual chloride or other halide impurity, the majority of the chloride-containing components can be removed from the crude alkenyl or alkynyl-containing organosilicon compound through distillation.

Exemplary compounds for the alkenyl or alkynyl-containing organosilicon compound having the formula $R_n SiR^1_{4-n}$ include, but are not limited to, the following:

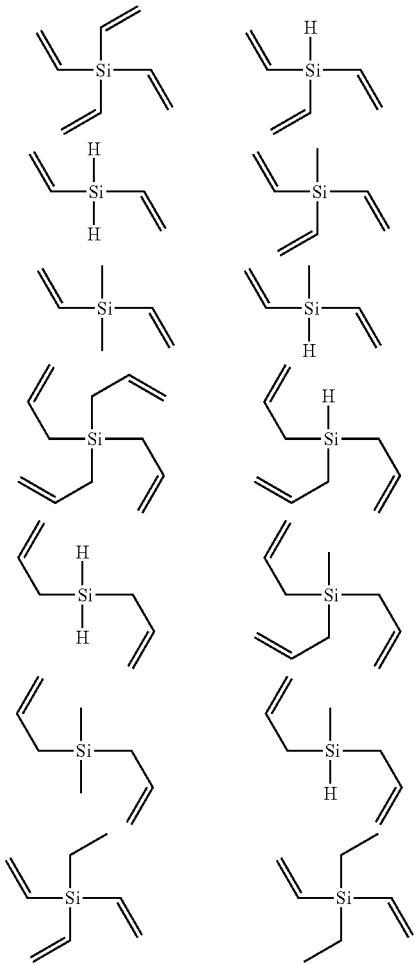

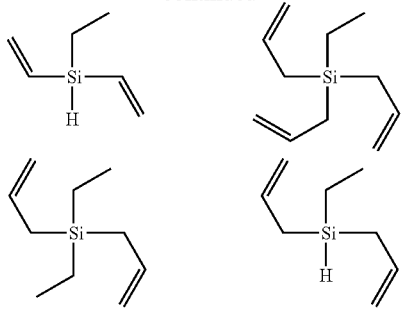

-continued

In certain embodiments, the alkenyl or alkynyl-containing organosilicon compound comprises tetravinylsilane (TVS).

In the formula above and throughout the description, the term "linear or branched alkyl" denotes a linear functional group having from 1 to 10, 3 to 10, or 1 to 6 carbon atoms. In the formulae above and throughout the description, the term "branched alkyl" denotes a branched functional group having from 3 to 10, or 3 to 6 carbon atoms. Exemplary linear or branched alkyl groups include, but are not limited to, methyl (Me), ethyl (Et), isopropyl ($Pr^i$), isobutyl ($Bu^i$), sec-butyl ($Bu^s$), tert-butyl ($Bu^t$), iso-pentyl, tert-pentyl (am), isohexyl, and neohexyl. In certain embodiments, the alkyl group may have one or more functional groups such as, but not limited to, an alkoxy group, a dialkylamino group or combinations thereof, attached thereto. In other embodiments, the alkyl group does not have one or more functional groups attached thereto. The alkyl group may be saturated or, alternatively, unsaturated.

In the formulae above and throughout the description, the term "cyclic alkyl" denotes a cyclic group having from 3 to 10 or 5 to 10 atoms. Exemplary cyclic alkyl groups include, but are not limited to, cyclobutyl, cyclopentyl, cyclohexyl, and cyclooctyl groups. In certain embodiments, the cyclic alkyl group may have one or more $C_1$ to $C_{10}$ linear, branched substituents, or substituents containing oxygen or nitrogen atoms. In this or other embodiments, the cyclic alkyl group may have one or more linear or branched alkyls or alkoxy groups as substituents, such as, for example, a methylcyclohexyl group or a methoxycyclohexyl group.

In the formulae above and throughout the description, the term "aryl" denotes an aromatic cyclic functional group having from 3 to 10 carbon atoms, from 5 to 10 carbon atoms, or from 6 to 10 carbon atoms. Exemplary aryl groups include, but are not limited to, phenyl, benzyl, chlorobenzyl, tolyl, and o-xylyl.

In the formulae above and throughout the description, the term "alkenyl group" denotes a group which has one or more carbon-carbon double bonds and has from 2 to 12, from 2 to 10, or from 2 to 6 carbon atoms. Exemplary alkenyl groups include, but are not limited to, vinyl or allyl groups.

The term "alkynyl group" denotes a group which has one or more carbon-carbon triple bonds and has from 2 to 12 or from 2 to 6 carbon atoms.

In the formulae above and through the description, the term "unsaturated" as used herein means that the functional group, substituent, ring or bridge has one or more carbon double or triple bonds. An example of an unsaturated ring can be, without limitation, an aromatic ring such as a phenyl ring. The term "saturated" means that the functional group, substituent, ring or bridge does not have one or more double or triple bonds.

In certain embodiments, one or more of the alkyl group, alkenyl group, alkynyl group, aryl group, and/or cyclic alkyl group in the formulae may be "substituted" or have one or more atoms or group of atoms substituted in place of, for example, a hydrogen atom. Exemplary substituents include, but are not limited to, oxygen, sulfur, halogen atoms (e.g., F, Cl, I, or Br), nitrogen, alkyl groups, and phosphorous. In other embodiments, one or more of the alkyl group, alkenyl group, alkynyl group, aromatic and/or aryl group in the formulae may be unsubstituted.

The organosilicon compounds according to the present invention are preferably substantially free of halide. As used herein, the term "substantially free" as it relates to halide ions (or halides) such as, for example, chlorides (i.e. chloride-containing species such as HCl or organosilicon compounds having at least one Si—Cl bond) and fluorides, bromides, and iodides, means less than 100 ppm (by weight) measured by ion chromatography (IC), preferably less than 50 ppm measured by IC and more preferably less than 10 ppm measured by IC and most preferably 0 ppm measured by IC. Significant levels of chloride in the final product can cause leaching metals from the stainless steel container during storage or use into the organosilicon precursor in presence of moisture or water and the leached metal ions may catalyze polymerization of the organosilicon precursor to form high molecular weight impurities. The gradual degradation of the organosilicon compounds may directly impact the film deposition process making it difficult for the semiconductor manufacturer to meet film specifications. In addition, the shelf-life or stability is negatively impacted by the higher degradation rate of the organosilicon compounds, thereby making it difficult to guarantee a 1-2 year shelf-life. The organosilicon compounds are preferably substantially free of metal ions such as $Li^+$, $Na^+$, $K^+$, $Mg^{2+}$, $Ca^{2+}$, $Al^{3+}$, $Fe^{2+}$, $Fe^{3+}$, $Ni^{2+}$, $Cr^{3+}$. As used herein, the term "substantially free" as it relates to Li, Na, K, Mg, Ca, Al, Fe, Ni, Cr means less than 5 ppm (by weight), preferably less than 3 ppm, and more preferably less than 1 ppm, and most preferably 0.1 ppm as measured by ICP-MS. The organosilicon compounds are preferably also substantially free of water or organosilane impurities such as other alkenyl or alkynyl-containing organosilicon compounds either from starting materials or by-products from the synthesis, as used herein, the term "substantially free" as it relates to water is less than 100 ppm (by weight) as analyzed by Karl Fisher, preferably less than 50 ppm, and more preferably less than 10 ppm; the sum of all organosilane impurities such as trivinylchlorosilane as analyzed by gas chromatography (GC) is less than 1.0 wt. %, preferably less than 0.5 wt. %, and preferably less than 0.1 wt. %.

In some embodiments, added to the distilled alkenyl or alkynyl-containing organosilicon precursor composition is a stabilizer compound. Exemplary stabilizer compounds include 2,6-di-tert-butyl-4-methyl phenol (or BHT for butylhydroxytoluene), 2,2,6,6-tetramethyl-1-piperidinyloxy (TEMPO), 2-tert-butyl-4-hydroxyanisole, 3-tert-butyl-4-hydroxyanisole, propyl ester 3,4,5-trihydroxy-benzoic acid, 2-(1,1-dimethylethyl)-1,4-benzenediol, diphenylpicrylhydrazyl, 4-tert-butylcatechol, N-methylaniline, p-methoxydiphenylamine, diphenylamine, N,N'-diphenyl-p-phenylenediamine, p-hydroxydiphenylamine, phenol, octadecyl-3-(3, 5-di-tert-butyl-4-hydroxyphenyl) propionate, tetrakis (methylene (3,5-di-tert-butyl)-4-hydroxy-hydrocinnamate) methane, phenothiazines, alkylamidonoisoureas, thiodiethylene bis (3,5-di-tert-butyl-4-hydroxy-hydrocinnamate, 1,2-bis (3,5-di-tert-butyl-4-hydroxyhydrocinnamoyl) hydrazine, tris (2-methyl-4-hydroxy-5-tert-butylphenyl) butane, cyclic neopentanetetrayl bis (octadecyl phosphite), 4,4'-thiobis (6-tert-butyl-m-cresol), 2,2'-methylenebis (6-tert-butyl-p-cresol), oxalyl bis (benzylidenehydrazide) and naturally occurring antioxidants such as raw seed oils, wheat germ oil, tocopherols and gums. The function of the stabilizer compound is to prevent self-polymerization or oligomerization of the alkenyl or alkynyl-containing organosilicon precursor.

The method of the present development comprises the step of packaging the distilled alkenyl or alkynyl-containing organosilicon precursor composition in a container, wherein the container permits transmission into the container of no more than 10% of ultraviolet and visible light having a wavelength of between 290 nm to 450 nm. As used herein, the packaged distilled alkenyl or alkynyl-containing organosilicon precursor composition in the container as described herein is referred to as a "system."

In some embodiments, the container permits transmission of no more than 7% of ultraviolet and visible light having a wavelength of between 290 nm to 450 nm. In other embodiments, the container permits transmission of no more than 5% of ultraviolet and visible light having a wavelength of between 290 nm to 450 nm. In other embodiments, the container permits transmission of no more than 3% of ultraviolet and visible light having a wavelength of between 290 nm to 450 nm. In other embodiments, the container permits transmission of no more than 2% of ultraviolet and visible light having a wavelength of between 290 nm to 450 nm. In yet another embodiments, the container permits transmission of no more than 1% of ultraviolet and visible light having a wavelength of between 290 nm to 450 nm. In still other embodiments, the container permits 0% transmission into the container of ultraviolet and visible light having a wavelength of between 290 nm to 450 nm.

The percent of UV and visible light transmission through a solid medium can be measured by any method known to those skilled in the art such as, for example, UV-VIS absorption spectroscopy, where a sample is illuminated from one side, and the intensity of the light that exits from the sample in every direction is measured. Any UV-VIS absorption instrument commercially available may be employed to measure transmission of ultraviolet and visible light having a wavelength of between 290 nm to 450 nm according to the present invention.

The material from which the container is made and the thickness of the container's wall structure operably inhibits transmission of light through the container wall structure having a wavelength between about 290 nm to 450 nm. In some embodiments, the container is made of stainless steel. If a glass or quartz container is employed, then either the container has walls thick enough to prevent the transmission of ultraviolet and visible light having a wavelength of between 290 nm to 450 nm or the walls of such container are covered with a layer of material to prevent the transmission of ultraviolet and visible light having a wavelength of between 290 nm to 450 nm. Examples of such materials include metal foils and synthetic resin coatings.

An example of a container that can be employed in the present invention is the high-purity chemical container disclosed in U.S. Pat. No. 7,124,913 to Air Products and Chemicals, Inc. (Allentown, Pa.), and incorporated herein by reference.

Preferably, the container once filled with the distilled alkenyl or alkynyl-containing organosilicon precursor composition of the present invention is stored at a temperature of from 15° C. to 30° C., and more preferably at room temperature.

The following working examples show the importance of obtaining alkenyl and alkynol blends with low levels of impurities such as higher molecular weight species, moistures and halogens such as chloride

Example 1

Samples from two different sources of tetravinylsilanes (TVS) were analyzed by Gel Permeation Chromatography (GPC) to determine the concentration of higher molecular weight (HMW) species present in the liquid. Table 1 below shows the comparative samples showing TVS containing >1 wt. % of HMW species (>1000 atomic mass unit (amu), for example species or oligomers having molecular weight ranging from 1000 to 20000 amu) and TVS containing 0.1 wt. % (1000 ppm) higher molecular weight species (>1000 amu). The two sources of TVS would have significantly differing impacts on the continuous delivery of TVS through the DLI system and into the CVD process chamber.

TABLE 1

| Sample | wt. % species ~150 amu | wt. % species >1000 amu |
|---|---|---|
| 1 | 98.4 | 1.6 |
| 2 | 99.9 | 0.1 |

Example 2: The Impact of TVS with Higher Concentration of Impurities Having amu of 1000 or Higher A flow test was done on Versum Materials DLI (direct liquid injection) test system with Horiba STEC LF-410A liquid flow meter and MV1000 vapor injector. 840 g of Tetravinylsilane (TVS) chemical was transferred under inert atmosphere to a Versum materials Chemguard™ liquid containment system. The TVS chemical assay was 96 wt. %, HMW impurity was 1.8 wt. %, chloride content was 97 ppm and $H_2O$ content was 1076 ppm. The injector temperature was set to 100° C. The injector downstream line was heated to 110° C. Helium gas set at a pressure of 30 pisg was used to push the liquid to the vapor injector. An additional 100 sccm of helium was used as an inert carrier gas across the injector interface. The liquid flow was set at 0.3 g/min. The liquid flow was periodically turned ON for 8 minutes and turned OFF for 2 mins controlled by PLC. The liquid flow and pressure in the line initially were very stable. After 11 hours of chemical flow cycling, the liquid flow rate and line pressure started to fluctuate, indicating a disruption in stable flow of chemical to the process chamber. After the test, the TVS container was unloaded from the Chemguard™ tool and a container with 1 kg of hexane was installed onto Chemguard™. A hexane solvent flush was performed with the same tool set up. The hexane flow was not stable, confirming the injector was partially clogged. After the flow test was complete, the injector and tubing located post injector was inspected for residue. Some amount of brownish polymer material was found in the injector and tubing post injector. The hexane flush results also indicated that the oligomers/polymers formed from TVS with a high HMW impurity level could not be solubilized using hexane. Not to be bound by theory, these results suggest that the oligomers/polymers are accumulated in a region of the DLI system where the solvent has been vaporized and thus not capable of solvating the oligomers, causing unstable flow of chemical into the process chamber.

Comparative Example 3: High Purity TVS Flow Test

For comparison, a flow test was done on Versum Materials DLI (direct liquid injection) test system with Horiba STEC LF-410A liquid flow meter and MV1000 vapor injector with distilled high purity TVS chemical. 860 g of distilled TVS chemical was transferred under inert atmosphere to a Versum materials Chemguard™ liquid containment system. The TVS chemical assay was 99.5%, chloride content was 0.2 ppm and $H_2O$ content was 35 ppm. The injector temperature was set to 100° C. The injector downstream line was heated to 110° C. Helium gas at a pressure of 30 psig was used to push the liquid to the vapor injector. An additional 100 sccm of helium was used as an inert carrier gas across the injector interface. The liquid flow was set at 0.3 g/min. The liquid flow was periodically turned ON for 8 minutes and turned OFF for 2 mins controlled by PLC. The liquid flow rate and line pressure and injector control voltage were stable throughout the test until the chemical supply ran out after 27 hours of flow test. After the test, the TVS container was unloaded from the Chemguard™ tool and a container with hexane was installed into the Chemguard™. A hexane flush was performed with the same tool set up. The hexane flow was stable, indicating that no oligomers/polymers were impeding the delivery of chemical through the DLI and to the tool.

Example 4: The Stability or Shelf Life of TVS is Impacted by the Initial Concentration of Higher Molecular Weight Impurities An accelerated aging test was performed by heating TVS samples at 125° C. to determine how impurity concentration can increase over time. Observed in Table 2 was an increase in higher molecular weight (HMW) impurities (>1000 amu such as) determined by GPC after heating of the samples and exposure for 1-3 days. Without intending to be bound by a particular theory, it is believed that this increase is observed resulting from self-polymerization of the TVS. The consequences of this polymerization would be the observed reduction of chemical flow into the deposition chamber as discussed above. Oligomers or high molecular weight impurities was determined by GPC. Results indicate that lower initial HMW impurity concentrations will result in more gradual increases over the lifetime of material, which should greatly reduce the risk of chemical delivery interruptions.

TABLE 2

| Sample | Aging Condition | High Molecular Weight Impurity Conc (wt. %) (>1000 amu) |
|---|---|---|
| 1 | Unheated (control) | 0.10 |
|   | Heated 1 day 125° C. | 0.19 |
|   | Heated 2 days 125° C. | 0.35 |
|   | Heated 3 days 125° C. | 0.67 |
| 2 | Unheated (control) | 0.29 |
|   | Heated 1 day 125° C. | 0.37 |
|   | Heated 2 days 125° C. | 0.70 |
|   | Heated 3 days 125° C. | 0.96 |

Example 5: The Effect of the Water and Chloride Levels of TVS on the Corrosion of Stainless Steel Experiments were done to assess the effect of water and chloride in TVS (tetravinylsilane) on the corrosion of stainless steel. TVS with different levels of water and chloride were heated in electropolished 316L stainless steel tubes to simulate prolonged storage conditions at room temperature.

Four samples of TVS with different amounts of water and chloride were heated in separate stainless steel tubes for 7 days at 80° C. One week at 80° C. is intended to simulate the ageing that would normally occur over one year at ambient temperature. For the purpose of this experiment accelerated aging is assumed to follow the Arrhenius principle using the modified 10-degree rule methodology. For any age, at an accelerated aging temperature, the equivalent room temperature age can be estimated by the equation below where $t_{rt}$ is the room temperature equivalent age, $t_{AA}$ is the age at the accelerated aging temperature, $T_{AA}$ is the accelerated aging temperature in ° C., $T_{rt}$ is room temperature (22° C.), and $Q_{10}$ is the reaction rate coefficient that is set to 2 for the current test. A further description of accelerated aging method can be found in ASTM method F1980-07.

$$t_{rt} = t_{AA} \times Q_{10}^{(T_{AA}-T_{rt})/10} \qquad \text{Eqn 1}$$

Test Sample #1 had low chloride and low water; Sample #2 had low chloride and high water; Sample #3 had high chloride and low water; and Sample #4 had high chloride and high water. These 4 samples of TVS were analyzed for their stainless steel metals content (Fe, Cr, Ni, Mn and Mo) by ICP-MS (inductively coupled plasma-mass spectrometry) before and after heat treatment. These were also analyzed by GC (gas chromatography) before and after heating to assess the impact of ageing on the TVS purity. A summary of these four samples and the analytical results are in Table 3 below.

No increase in any of the stainless steel metals was observed after ageing TVS Sample #1 (low chloride, low water). This was not the case for TVS Samples #2-4. Increases in Ni, Cr and Mn were observed for the TVS Samples #2-4, all of which had high chloride, high water or high chloride and high water. An increase in the stainless steel metals content after heating is an indication of the corrosion that would occur after storage of the TVS in a stainless steel vessel after one year at room temperature. The overall purity as measured by GC did not change significantly after the heat treatment. No color change was evident before/after ageing of any of the TVS samples, irrespective of the chloride or water content.

These experiments demonstrate the importance of low chloride and low water in TVS to avoid corrosion of the stainless steel containers which would lead to leaching of the stainless steel metals, such as Fe, Cr, Ni, Mn and Mo, into the TVS liquid.

TABLE 3

Summary of analytical results for the 4 test samples.

| | | Test Sample # | | | |
|---|---|---|---|---|---|
| | | # 1 | # 2 | # 3 | # 4 |
| Description | | low Cl/ low H2O | low Cl/ high H2O | high Cl/ low H2O | high Cl/ high H2O |
| Cl (ppm) | | 0.1 | 1.0 | 79 | 79 |
| Water (ppm) | | 28 | 610 | 17 | 2350 |
| GC purity before heat (%) | | 99.47 | 99.15 | 97.96 | 98.73 |
| GC purity after heat (%) | | 99.46 | 99.15 | 97.95 | 98.94 |

TABLE 3-continued

Summary of analytical results for the 4 test samples.

| | | Test Sample # | | | |
|---|---|---|---|---|---|
| | | # 1 | # 2 | # 3 | # 4 |
| Conc before heat (ppb) | Fe | 11 | 94 | 24 | 133 |
| | Cr | 1 | 4 | 2 | 6 |
| | Ni | 1 | 7 | 6 | 10 |
| | Mo | 0 | 2 | 1 | 1 |
| | Mn | 0 | 1 | 1 | 1 |
| Avg conc after heat (ppb) | Fe | 10 | 95 | 22 | 122 |
| | Cr | 1 | 9 | 1 | 10 |
| | Ni | 1 | 53 | 23 | 32 |
| | Mo | 0 | 2 | 1 | 2 |
| | Mn | 0 | 3 | 5 | 5 |
| Conc. change (ppb) | Fe | −1 | 1 | −2 | −11 |
| | Cr | 0 | 5 | −1 | 4 |
| | Ni | 0 | 46 | 17 | 22 |
| | Mo | 0 | 0 | 0 | 1 |
| | Mn | 0 | 2 | 4 | 4 |

Although certain principles of the invention have been described above in connection with aspects or embodiments, it is to be clearly understood that this description is made only by way of example and not as a limitation of the scope of the invention.

The invention claimed is:

1. A method for producing an alkenyl or alkynyl-containing organosilicon precursor composition for use as precursors to dielectric materials, the method comprising the steps of:

distilling at least once a composition comprising at least one alkenyl or alkynyl-containing organosilicon compound having a formula RnSiR14-n wherein R is selected from the group consisting of a linear or branched C2 to C6 alkenyl group, and a linear or branched C2 to C6 alkynyl group; R1 is selected from the group consisting of hydrogen, a linear or branched C1 to C10 alkyl group, and a C3 to C10 aryl group; and n is 1 to 4, wherein a distilled alkenyl or alkynyl-containing organosilicon precursor composition is produced after distilling, wherein the at least one alkenyl or alkynyl-containing organosilicon compound comprises tetravinylsilane, and wherein the distilled alkenyl or alkynyl-containing organosilicon precursor composition includes less than 100 ppm (0.01 wt. %) of >1000 amu impurities as determined by Gel Permeation Chromatography (GPC); and packaging the distilled alkenyl or alkynyl-containing organosilicon precursor composition in a container, wherein the container is made of stainless steel and permits transmission into the container of no more than 10% of ultraviolet and visible light having a wavelength of between 290 nm to 450 nm; and wherein the distilled alkenyl or alkynyl-containing organosilicon precursor composition includes less than 50 ppm water impurity and less than 10 ppm halide impurity.

2. The method of claim 1 further comprising adding a stabilizer compound to the distilled alkenyl or alkynyl-containing organosilicon precursor composition prior to said packing step.

3. The method of claim 2 wherein the stabilizer compound is selected from the group consisting of 2,6-di-tert-butyl-4-methyl phenol, 2,2,6,6-tetramethyl-1-piperidinyloxy (TEMPO), 2-tert-butyl-4-hydroxyanisole, 3-tert-butyl-4-hydroxyanisole, propyl ester 3,4,5-trihydroxy-benzoic acid, 2-(1,1-dimethylethyl)-1,4-benzenediol, diphenylpicrylhydrazyl, 4-tert-butylcatechol, N-methylaniline, p-methoxydiphenylamine, diphenylamine, N,N'-diphenyl-p-phenylenediamine, p-hydroxydiphenylamine, phenol, octadecyl-3-(3, 5-di-tert-butyl-4-hydroxyphenyl) propionate, tetrakis (methylene (3,5-di-tert-butyl)-4-hydroxy-hydrocinnamate) methane, phenothiazines, alkylamidonoisoureas, thiodiethylene bis (3,5-di-tert-butyl-4-hydroxy-hydrocinnamate, 1,2-bis (3,5-di-tert-butyl-4-hydroxyhydrocinnamoyl) hydrazine, tris (2-methyl-4-hydroxy-5-tert-butylphenyl) butane, cyclic neopentanetetrayl bis (octadecyl phosphite), 4,4'-thiobis (6-tert-butyl-m-cresol), 2,2'-methylenebis (6-tert-butyl-p-cresol), oxalyl bis (benzylidenehydrazide), raw seed oils, wheat germ oil, tocopherols and gums.

4. The method of claim 1 wherein the container permits transmission into the container of no more than 7% of ultraviolet and visible light having a wavelength of between 290 nm to 450 nm.

5. The method of claim 4 wherein the container permits transmission into the container of no more than 1% of ultraviolet and visible light having a wavelength of between 290 nm to 450 nm.

6. The method of claim 5 wherein the container permits 0% transmission into the container of ultraviolet and visible light having a wavelength of between 290 nm to 450 nm.

7. The method of claim 1, wherein the distilled alkenyl or alkynyl-containing organosilicon precursor composition comprises at least about 98.73 wt. % tetravinylsilane.

8. The method of claim 7, wherein the distilled alkenyl or alkynyl-containing organosilicon precursor composition comprises at least about 99.15 wt. % tetravinylsilane.

\* \* \* \* \*